Figure 1:
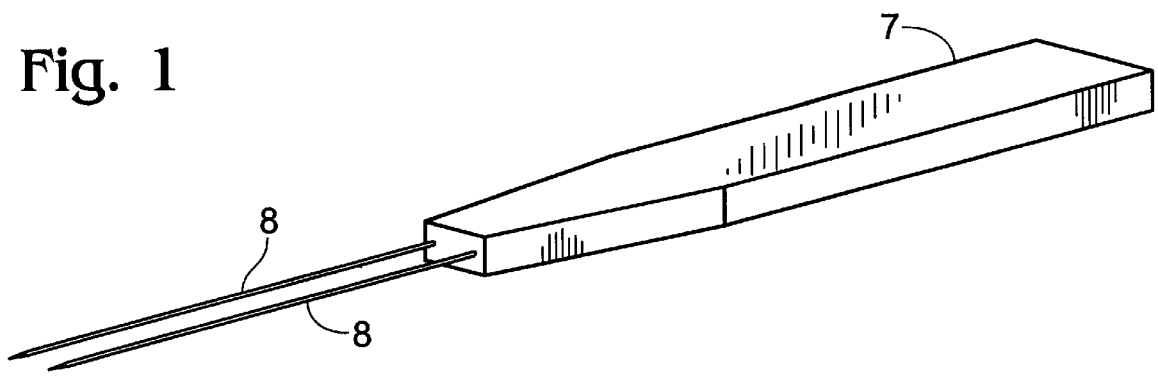

United States Patent
Harmon

[11] Patent Number: 5,906,052
[45] Date of Patent: May 25, 1999

[54] UTENSIL WHICH INDICATES WHEN THE INSIDE OF A MARSHMALLOW IS MELTED

[76] Inventor: Douglas A. Harmon, 39011 NE. 216th Ave., Amboy, Wash. 98601

[21] Appl. No.: 08/806,552

[22] Filed: Feb. 25, 1997

[51] Int. Cl.$^6$ ...................................................... A47J 43/28
[52] U.S. Cl. ................................................................ 30/322
[58] Field of Search ............................. 30/322–324, 129, 30/140, 147, 148

[56] References Cited

U.S. PATENT DOCUMENTS

| | | | |
|---|---|---|---|
| 99,971 | 2/1870 | Taylor et al. | 30/322 X |
| 1,546,334 | 7/1925 | Amundson | 30/322 UX |
| 2,125,112 | 7/1938 | Ingham | 30/322 UX |
| 3,742,840 | 7/1973 | Cogswell | 99/421 A |
| 3,744,403 | 7/1973 | Castronuovo | 99/421 V |
| 3,745,910 | 7/1973 | Delmarter | 99/419 |
| 3,760,501 | 9/1973 | Johnston | 30/322 |
| 4,126,086 | 11/1978 | Valade | 99/419 |
| 4,539,751 | 9/1985 | Chan | 30/322 |
| 5,117,558 | 6/1992 | Hull | 30/323 |

FOREIGN PATENT DOCUMENTS 17401 of 1901 United Kingdom ..................... 30/322

*Primary Examiner*—Douglas D. Watts
*Attorney, Agent, or Firm*—Kolisch, Hartwell, Dickinson, McCormack, & Heuser

[57] ABSTRACT

The utensil which indicates when the inside of a marshmallow is melted includes a user-grippable handle (7) having a plurality of elongated wires (8) extending from one end for impaling a marshmallow for toasting. Wires (8) are flexible to be drawn together at open end for impaling marshmallow and are biased to return to their original position precisely when marshmallow is melted inside. The utensil would typically be held in users hand to toast marshmallow over open heat source.

10 Claims, 2 Drawing Sheets

UTENSIL WHICH INDICATES WHEN THE INSIDE OF A MARSHMALLOW IS MELTED

BACKGROUND—FIELD OF INVENTION

This invention relates to utensils, and specifically to utensils used to cook something over an open heat source.

BACKGROUND—DESCRIPTION OF PRIOR ART

Campers sitting around the fire and people having backyard barbecues often like to toast marshmallows to snack on or to make a dessert known as a smore. A smore is a thin piece of chocolate and a toasted marshmallow between two graham cracker halves. These people enjoy a perfectly toasted marshmallow which is completely melted on the inside and golden brown on the outside. Getting the outside done was fairly easy since you can see it getting browner the longer it is toasted. The problem is knowing when the inside is done. To get the inside done it would usually burn on the outside or when the inside melted, it would fall into the fire. Either way, the marshmallow would be inedible.

Furthermore, for those people who like the perfect smore, it is difficult to get the marshmallow done perfectly so the chocolate inside the smore melts and the marshmallow melds completely with all the flavors to give you the perfect smore.

Originally, people made utensils for toasting marshmallows from tree branches or sticks. These would hold a marshmallow but were not sanitary to eat from, would catch fire, and did not indicate when the marshmallow was melted inside. To tell when the inside was melted the marshmallow would usually fall into the fire; or you would have to burn the outside making the marshmallow inedible.

Attempting to find a better way to hold a marshmallow, probably a piece of wire, a skewer, or even a coat hanger was used. These were an improvement since they were more sanitary and did not catch fire; but they would get hot when holding and the user could get burned and when they did get hot the marshmallow would fall off into the fire even more easily. More importantly, they did not indicate when the marshmallow was melted inside.

Thereafter, inventors have created different utensils used to cook over an open fire which are clean and safe. Some of the prior art patents are U.S. Pat. No. 3,742,840 to Cogswell (1973), U.S. Pat. No. 3,745,910 Delmater (1973), U.S. Pat. No. 3,760,501 Johnston (1973), U.S. Pat. No. 4,126,086 to Valade (1978), U.S. Pat. No. 4,539,751 Chan (1985), U.S. Pat. No. 5,117,558 Hull (1992). These all disclose hand-held forks that are used for impaling food for barbecuing or open fire cooking. However, these utensils were good for nothing more than holding something to be cooked, not indicating when anything was done on the inside. These utensils were also made to hold meat products which created the problem of cross-contamination. If you used the utensil to cook meat and did not clean it before using it to hold a marshmallow you would have the possibility of cross-contamination which could make you sick.

These examples are cleaner and safer than a stick, yet do nothing more than hold something to be cooked, leaving you to guess when the cooking is done. Thus, by not knowing when the inside of the marshmallow was melted, you would burn the outside, making it inedible or leaving the non-melted center on the end of the utensil.

Although a marshmallow toaster U.S. Pat. No. 3,744,403 to Castronuovo (1973),was created to toast a marshmallow, it was electric like a toaster oven, and not used for cooking over open fire. Also it would be very expensive,is not portable or meant to be used outside, and would still not indicate when the inside was melted.

Therefore, no prior art specifically indicates when the inside of a marshmallow is melted. They were made to cook anything over open flame including hot dogs and sausages. Still the problem exists that you could not get the outside of the marshmallow perfectly brown and get the inside melted perfectly too.

Accordingly, a need exists for a utensil for holding just marshmallows which indicates when the inside of the marshmallow is melted, and also which is designed to hold the marshmallow after the inside is completely melted.

OBJECT AND ADVANTAGES

Accordingly, besides the objects and advantages of the toasting utensils in my patent above, several objects and advantages of the present invention are:

(a) to provide a utensil which indicates when the center of a marshmallow is melted when toasting over open heat;
(b) to provide a utensil just for holding marshmallows while toasting;
(c) to provide a utensil which stays cool even while using for long periods of time;
(d) to provide a utensil which is easy to use;
(e) to provide a utensil which is easy to clean;
(f) to provide a utensil which helps keep a person from heating a marshmallow so hot they could burn themselves; and
(g) to provide a utensil which will hold a marshmallow after the center is melted so you can let it cool or use it for a smore.

Further objects and advantages are to provide a utensil to hold a marshmallow for toasting which indicates when the inside of the marshmallow is melted perfectly, which is simple to use and inexpensive to manufacture, which keeps the fun in toasting a marshmallow and lets a user of almost any age make the perfect marshmallow. Still further objects and advantages will become apparent from consideration of the ensuing description and drawings.

DRAWING FIGURES

Figure 2:
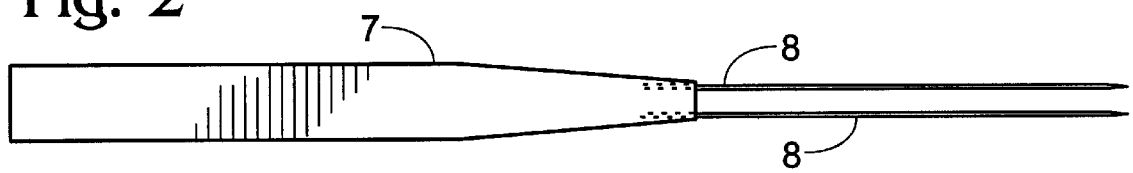
Figure 3:
Figure 4:
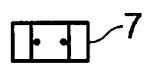
Figure 5:
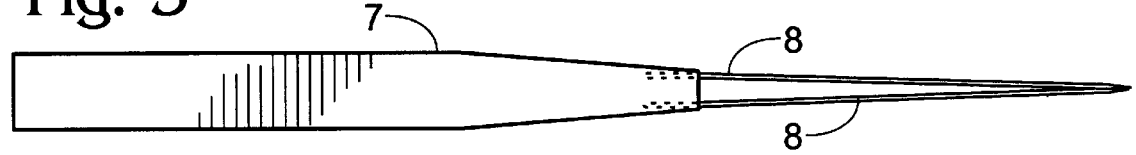
Figure 6:
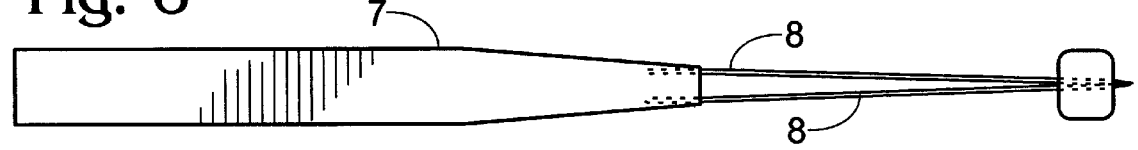
Figure 7:
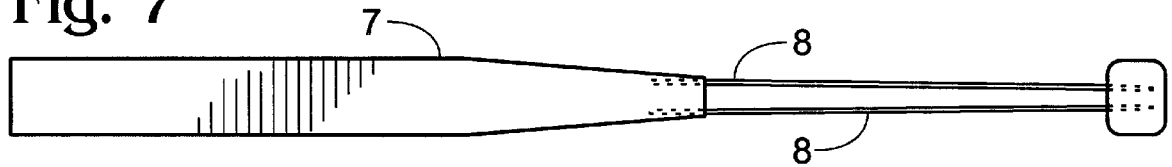
Figure 8:
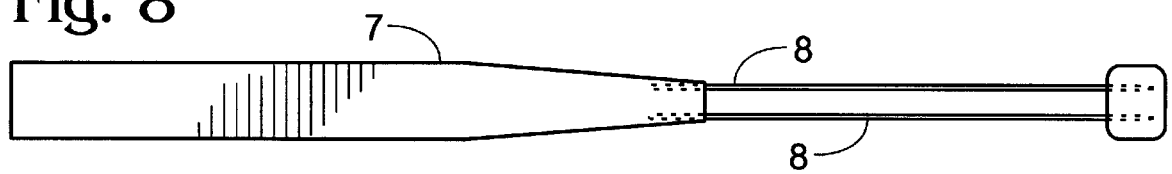
Figure 9:
Figure 10:
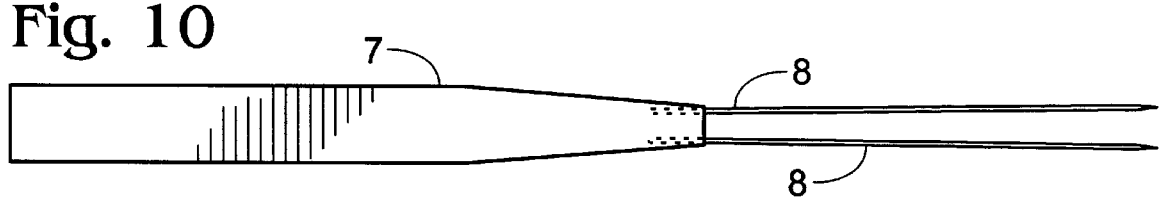

FIG. 1 shows a perspective view of utensil.
FIG. 2 shows top view of utensil.
FIG. 3 shows side view of utensil.
FIG. 4 shows view of end with wires.
FIG. 5 shows top view of utensil ready to have a marshmallow put on it for toasting.
FIG. 6 shows top view of utensil with marshmallow impaled ready to toast.
FIG. 7 shows top view of utensil with marshmallow impaled on wires and wires starting to spread as marshmallow starts to melt.
FIG. 8 shows top view of utensil with marshmallow impaled on wires completely melted and wires back to their original position.
FIG. 9 shows top view of utensil with wires set at a different depth in handle and possible hole in handle for hanging when not in use.
FIG. 10 shows top view of utensil with wires set at a slight angle in handle.

REFERENCE NUMERALS IN DRAWINGS

7 Handle
8 Wire

Description—FIGS. 1 to 5

Referring now to the drawings in detail, the typical embodiment of the utensil of my present invention is illustrated in FIG. 2 (top view) and FIG. 4 (end view). The utensil has a handle 7 consisting of a piece of ridge material of predetermined length constituting a user-grippable region. In the preferred embodiment, the handle is wood. However the handle can consist of any other rigid material that does not melt or conduct heat and is lightweight.

There is a taper at one end of said handle 7 with two elongated wires 8 of predetermined length extending out of tapered end, this end is the mounting surface. Wires 8 are secured in two holes of predetermined width and depth that give the utensil a fork like look. Wires 8 are sufficiently flexible to enable the open ends to be drawn together and of sufficient strength to support a marshmallow when impaled on end. Wires 8 are of metal material of hardness and quality as to be biased to spread apart and return to their original position repeatedly even after getting hot. Wires 8 are of predetermined length as to spread apart precisely when the inside of a marshmallow is perfectly done.

Typically, said handle 7 is 2 cm to 2.5 cm in thickness, and has overall dimensions roughly 40 cm long and 4 cm to 5 cm wide. Approximately 15 cm from one end there is a taper to approximately 2.5 cm at short end constituting mounting surface. There are two holes drilled approximately 2 cm apart and 5 cm deep at tapered end. Two elongated wires 8 of 15 gauge, hardened stainless steel approximately 30 cm in length extending out of holes in a generally parallel configuration.

Additional views are shown in FIGS. 1,3,5,6,7,8,9, and 10. In FIG. 1 the utensil is shown in a perspective view; FIG. 3 shows the side view. In FIG. 5 the utensil is shown in a top view with the wires together to create a point ready for impaling marshmallow. In FIG. 6 the utensil is shown in a top view with marshmallow impaled on utensil ready to toast. In FIG. 7 the utensil is shown in a top view with marshmallow impaled on wires about half way though toasting when wires start to spread as center of marshmallow is starting to melt. In FIG. 8 the utensil is shown in a top view with marshmallow impaled on wires with marshmallow completely toasted and wires back to their original position, center completely melted. In FIG. 9 utensil is shown in a top view with a hole in handle for hanging and wires set at a different depth in handle. In FIG. 10 utensil is shown in a top view with wires set at a slight angle in handle.

From the description above, a number of advantages of my invention become evident:

(a) handle stays cool even while using for long periods of time;
(b) us ed specifically for marshmallows so there is no cross contamination from raw meats or other contaminating products;
(c) can keep outside of marshmallow cooler since the outside doesn't have to burn in order to get the inside done. Marshmallow may be kept at golden brown until inside is done;
(d) easy to clean after using, making a more sanitary utensil;
(e) marshmallow is cooked to desired temperature to melt chocolate for the "perfect smore";
(f) marshmallow stays on end of utensil after inside is melted instead of falling into fire.

Operation—FIGS. 2,5, and 6

The manner of using this utensil to toast a marshmallow is a very simple one. First make sure ends of wires not connected to handle are about one inch apart from each other in a generally parallel configuration and cool to the touch FIG. 2. User (not shown) holding in hand at tapered end squeezes wires so that the wires touch each other at open end forming a point FIG. 5. Take a marshmallow in the other hand and push the point of wires though one of the flat sides until the wires protrude slightly through the other side FIG. 6. Gently toast marshmallow over open heat source. As inside of marshmallow melts and gets soft, the wires will start to spread apart FIG. 7. When marshmallow is golden brown and the wires are back to their original position the marshmallow is ready to eat FIG. 8. Wait a few seconds to let marshmallow cool slightly, remove by gently squeezing marshmallow with fingers, pulling it off of utensil, or place directly in ready made smore to melt chocolate perfectly. After finished with utensil, heat dirty end slightly and wipe clean with a damp cloth. Repeat and enjoy.

SUMMARY, RAMIFICATION, AND SCOPE

Accordingly,the reader will see that my toasting utensil is of simple construction and easy to use so as to provide a device that will be economically feasible, long lasting and relatively trouble-free in operation.

Furthermore, the utensil has additional advantages in that:

it indicates when the inside of a marshmallow is melted when cooking over open heat source;

it permits use for long periods of time without the handle becoming hot;

it permits easy cleanup after each use;

it permits use by persons of almost any age;

it provides a safer, more controlled way of toasting a marshmallow;

it provides a clean, sanitary way to toast marshmallows;

it provides a durable utensil that will last a long time;

it provides a utensil that is just for toasting marshmallows;

Although the description above contains many specificities these should not be construed as limiting the scope of the invention but as merely providing illustrations of the preferred embodiment of this invention. For example, the handle of the utensil can have other sizes or shapes such as round, square, oval, triangular, etc.; the handle can possibly be made of different materials such as plastic, metal, clay, etc. The handle can also have additional holes for hanging utensil for storage (FIG. 9) or possibly storing of wires if they become removable. The wires can also be made of a different gauge, hardness, metal composition, etc.; wires could also possibly be a different length or set at different depths or angles in handle FIG. 9 and FIG. 10.

Thus the scope of the invention should be determined by the appended claims and their legal equivalents, rather than by examples given.

What is claimed as new is:

1. A utensil for toasting a marshmallow, the utensil comprising:

a handle having a user-grippable region and a mounting surface; and a plurality of elongate wires extending away from the mounting surface in a generally spaced-apart configuration, each wire having a distal end away from the mounting surface, wherein the wires are elastically deformable between an unbiased position, in which the distal ends of the wires are spaced-apart from each other, and a biased position, in which the distal ends of the wires are drawn into contact with each other from the unbiased position to enable the distal ends of the wires to be embedded in a marshmallow, wherein a restoring force is established in the biased position that urges the wires away from each other and toward the unbiased position, wherein the restoring force is insufficient to draw the wires back toward the unbiased position when the wires are embedded in an unmelted marshmallow, and further wherein the restoring force is sufficient to draw the wires away from each other upon melting of the marshmallow, whereby a user can determine when the marshmallow is melted by monitoring the position of the wires.

2. The utensil of claim 1, wherein the wires diverge from each other as they extend away from the mounting surface in the unbiased position.

3. The utensil of claim 1, wherein the wires extend away from the mounting surface in a generally parallel configuration in the unbiased position.

4. The utensil of claim 1, wherein the mounting surface includes at least one socket from which the plurality of wires extend.

5. The utensil of claim 1, wherein the utensil is adapted to be held in a user's hand when used.

6. The utensil of claim 1, wherein marshmallow has an inner portion, and the plurality of wires are biased to return toward the unbiased position when the inner portion of the marshmallow is melted.

7. The utensil of claim 1, wherein the wires are removably and replaceably mounted on the mounting surface.

8. The utensil of claim 7, wherein the handle includes a hollow portion sized to house the wires when the wires are removed from the mounting surface.

9. A method for toasting a marshmallow, comprising:

providing a utensil having a handle with a user-grippable region and a mounting surface, and a plurality of elongate wires extending from the mounting surface in a spaced-apart configuration and having spaced-apart distal ends away from the mounting surface;

deforming elastically the plurality of wires to draw the distal ends together;

impaling a marshmallow on the distal ends, wherein the marshmallow retains the distal ends substantially together;

positioning the distal ends proximate a heat source to melt the marshmallow, wherein the distal ends spread away from each other as the marshmallow is melted.

10. A method for toasting a marshmallow, comprising:

providing a utensil having a handle with a user-grippable region and a mounting surface, and a plurality of elongate wires extending from the mounting surface in a spaced-apart configuration and having spaced-apart distal ends away from the mounting surface;

deforming elastically the plurality of wires to draw the distal ends toward each other to an elastically deformed position;

impaling a marshmallow on the distal ends, wherein the marshmallow retains the distal ends at least substantially in the elastically deformed position; and positioning the distal ends proximate a heat source to heat the marshmallow, wherein the distal ends spread away from each other as the marshmallow is heated.

* * * * *